United States Patent
Jung et al.

(10) Patent No.: US 9,240,179 B2
(45) Date of Patent: Jan. 19, 2016

(54) VOICE CONTROLLABLE INTERACTIVE COMMUNICATION DISPLAY SYSTEM AND METHOD

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 679 days.

(21) Appl. No.: 11/198,904

(22) Filed: Aug. 5, 2005

(65) Prior Publication Data
US 2007/0033047 A1 Feb. 8, 2007

(51) Int. Cl.
G10L 21/00 (2013.01)
G10L 13/033 (2013.01)
G10L 15/14 (2006.01)
H04M 1/27 (2006.01)
G10L 15/18 (2013.01)

(52) U.S. Cl.
CPC ............ G10L 13/033 (2013.01); G10L 15/142 (2013.01); H04M 1/271 (2013.01); G10L 15/18 (2013.01)

(58) Field of Classification Search
CPC . G06F 17/27; G06F 17/2715; G06F 17/2785; G06F 17/2809; G06F 17/2818; G06F 17/30401; G06F 17/3043; G06F 17/30684; G10L 15/142; G10L 15/18; G10L 15/1815; G10L 15/183; G10L 15/22; G10L 15/285; G10L 15/30; H04M 1/271; H04M 2201/40; H04M 2203/2061; H04M 3/5307
USPC .............. 704/200, 261, 270, 275, 270.1, 219, 704/220, 258, 254, 274, 218; 381/94.1, 110
See application file for complete search history.

(56) References Cited

U.S. PATENT DOCUMENTS

| | | | |
|---|---|---|---|
| 6,055,495 A * | 4/2000 | Tucker et al. | 704/210 |
| 6,539,931 B2 * | 4/2003 | Trajkovic et al. | 124/34 |
| 7,092,496 B1 * | 8/2006 | Maes et al. | 379/88.01 |
| 7,197,299 B2 * | 3/2007 | Jackson et al. | 455/412.1 |
| 7,233,982 B2 * | 6/2007 | Shenefiel | 709/219 |
| 7,590,538 B2 * | 9/2009 | St. John | 704/246 |
| 7,729,904 B2 * | 6/2010 | Bennett | 704/215 |
| 2002/0110226 A1 * | 8/2002 | Kovales et al. | 379/88.17 |
| 2002/0148455 A1 * | 10/2002 | Trajkovic et al. | 124/34 |
| 2003/0023435 A1 * | 1/2003 | Josephson | 704/235 |
| 2004/0058647 A1 * | 3/2004 | Zhang et al. | 455/41.2 |
| 2005/0071170 A1 * | 3/2005 | Comerford | 704/275 |
| 2005/0251224 A1 * | 11/2005 | Berg | 607/57 |
| 2008/0275700 A1 * | 11/2008 | Bingley et al. | 704/235 |

* cited by examiner

Primary Examiner — Vijay B Chawan

(57) ABSTRACT

A system and method for use with a voice-capable system, includes but is not limited to receiving a vocal input to the voice-capable system, receiving one or more instructions referential to the first speech output version of the vocal input, and creating a second speech output version of the vocal input representational of the first speech output version of the vocal input manipulated responsive to the one or more instructions.

50 Claims, 8 Drawing Sheets

FIG. 5

INTERFACE
500

Set of editing tools capable or interacting with the first speech output version of the vocal input
510

| a forwarding tool configured to forward to an identified location in the first speech output version of the vocal input 512 | a reverse tool configured to reverse to an identified location in the first speech output version of the vocal input 514 | an undo tool configured to reverse a prior action performed, a marking tool configured to mark a point in the first speech output version of the vocal input 516 | an expansion/ contraction tool configured to expand and/or contract a predetermined length of the first speech output version of the vocal input 518 | a confirmation tool configured to produce a second speech output version of the vocal input representational of the first speech output version of the vocal input manipulated responsive to use of one or more tools of the set of editing tools
520

VOICE CONTROLLABLE INTERACTIVE COMMUNICATION DISPLAY SYSTEM AND METHOD

TECHNICAL FIELD

The present application relates generally to voice-enabled interactive communication systems.

SUMMARY

In one aspect, a method for a voice-capable system includes but is not limited to receiving a vocal input to the voice-capable system; creating a first speech output version of the vocal input; receiving one or more instructions referential to the first speech output version of the vocal input, and creating a second speech output version of the vocal input representational of the first speech output version of the vocal input manipulated responsive to the one or more instructions. In addition to the foregoing, other method aspects are described in the claims, drawings, and text forming a part of the present application.

In another aspect, a voice-capable user interface is provided, the voice-capable user interface configured to manipulate a first speech output version of a vocal input. The voice-capable user interface includes a set of editing tools capable of interacting with the first speech output version of the vocal input, the set of tools including one or more of a forwarding tool configured to forward to an identified location in the first speech output version of the vocal input, a reverse tool configured to reverse to an identified location in the first speech output version of the vocal input, an undo tool configured to reverse a prior action performed, a marking tool configured to mark a point in the first speech output version of the vocal input, and an expansion/contraction tool configured to expand and/or contract a predetermined length of the first speech output version of the vocal input; and a confirmation tool configured to produce a second speech output version of the vocal input representational of the first speech output version of the vocal input manipulated responsive to use of one or more tools of the set of editing tools. In addition to the foregoing, other voice-capable user interface aspects are described in the claims, drawings, and text forming a part of the present application.

In another aspect, a computer program product for a voice-capable system can include a signal bearing medium bearing one or more instructions including, but not limited to one or more instructions for receiving a vocal input to the voice-capable system; one or more instructions for receiving one or more instructions referential to the first speech output version of the vocal input; and one or more instructions for creating a second speech output version of the vocal input representational of the first speech output version of the vocal input manipulated responsive to the one or more instructions. In addition to the foregoing, other computer program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other system aspects are described in the claims, drawings, and text forming a part of the present application.

In one aspect, a voice-capable communication device includes but is not limited to a processor, an an audio input and/or output circuitry coupled to the processor, a memory coupled to the processor, an interface module coupled to the processor, the interface module configured to (a) receive a vocal input to the voice-capable communication device, (b) receive one or more instructions referential to a first speech output version of the vocal input; and (c) create a second speech output version of the vocal input representational of the first speech output version of the vocal input manipulated responsive to the one or more instructions. In addition to the foregoing, other communication device aspects are described in the claims, drawings, and text forming a part of the present application.

In addition to the foregoing, various other method, system, and/or computer program product aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which:

FIG. 5 illustrates an interface module in accordance with an embodiment of the subject matter of the present application.

The use of the same symbols in different drawings typically indicates similar or identical items.

DETAILED DESCRIPTION OF THE DRAWINGS

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

According to William Crossman, Founder/Director of CompSpeak 2050 Institute for the Study of Talking Computers and Oral Cultures, VIVOs, (e.g., voice-in/voice-out computers that may operate using visual displays) may make written language obsolete. VIVOs potentially can perform the functions of written language without requiring people to learn to read and write and, therefore, enable illiterate people, using VIVOs, to access the stored information.

Opening the doors for potentially billions of people to electronically-stored data presents a host of issues related to voice-enabled interaction. More particularly, according to Crossman, billions of illiterate people will be able to access data previously available only to the computer literate. The increase in the number of people with access to the Internet will increase the need for systems that provide voice capabilities for voice mail and the like. Rather than a user relying on a keyboard, interactions with display text (e.g., on the visual display of your office phone, or on the visual display of your mobile device) requires tools for voice email systems (or other voice interactive systems) so that people do not have to rerecord a message every time they are unhappy with just a small part of what they said.

To address the needs of a VIVO system, embodiments herein present voice-cabable systems and tools to enable a user to interact with voice transmissions to create transmittable oral outputs efficiently and without having to rerecord transmissions.

Figure 1:
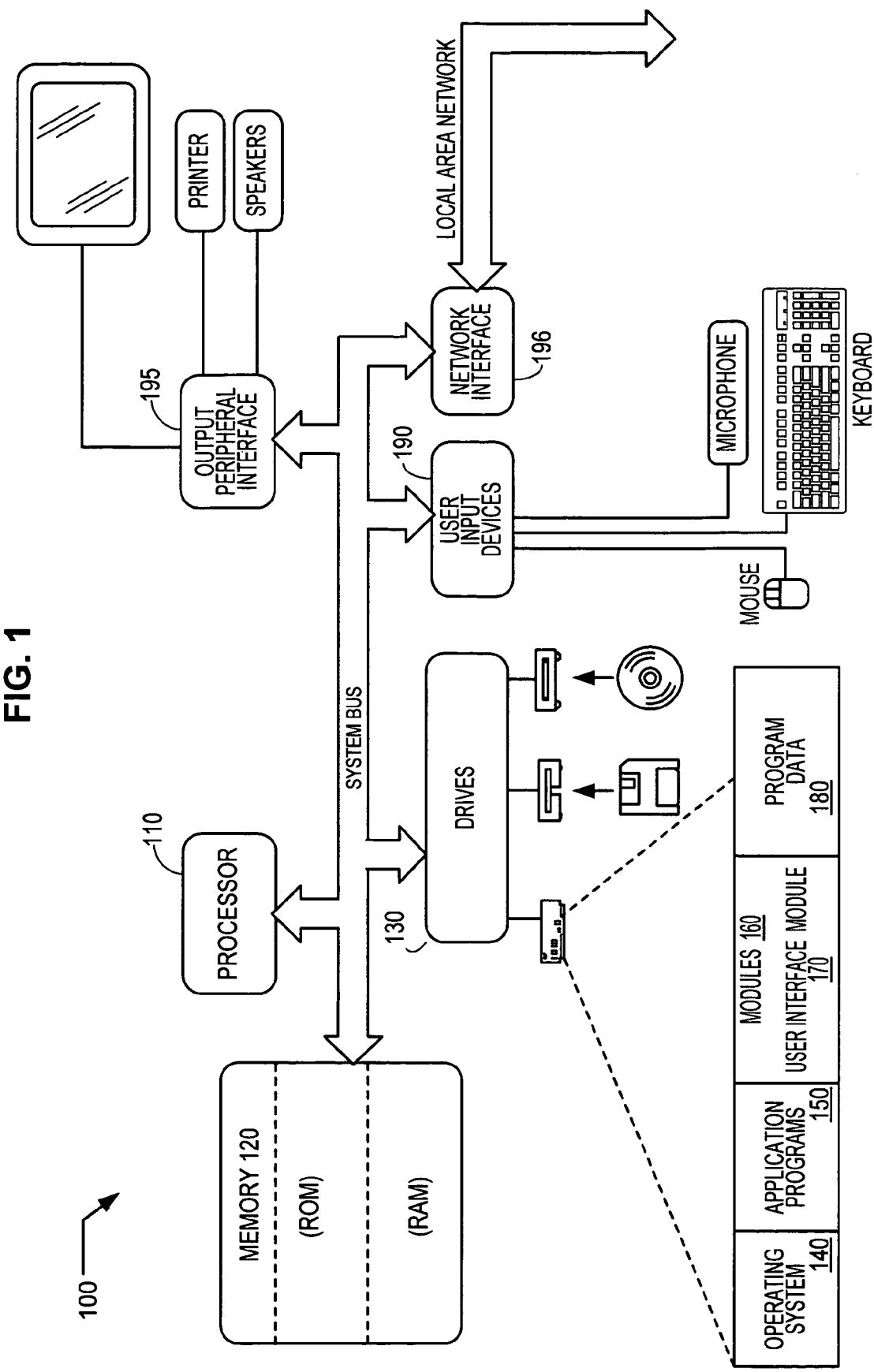
FIG. 1 is a block diagram of an exemplary computer architecture that supports the claimed subject matter of the present application.

With reference to FIG. 1, depicted is an exemplary computing system for implementing embodiments. FIG. 1 includes a computer 100, which could be a VIVO-capable computer, including a processor 110, memory 120 and one or more drives 130. The drives 130 and their associated computer storage media, provide storage of computer readable instructions, data structures, program modules and other data for the computer 100. Drives 130 can include an operating system 140, application programs 150, program modules 160, such as user interface module 170 and program data 180. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like. In one or more embodiments, user input devices 190 are VIVO enabling devices, enabling a user to provide voice activated responses and/or questions.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 195 or the like. More particularly, output devices can include VIVO enabling devices capable of providing voice output in response to voice input.

Computer 100 may operate in a networked environment using logical connections to one or more remote computers, such as a remote computer accessible by a Wide Area Network (WAN). The remote computer may be a personal computer, a server, a router, a network PC, a peer device or other common network node, and can include many or all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note however that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or adapter. When used in a WAN networking environment, computer 100 typically includes a modem or other means for establishing communications over the WAN, such as the Internet. It will be appreciated that other means of establishing a communications link between the computers may be used.

According to one embodiment, computer 100 is connected in a networking environment such that the processor 110 and/or user interface module 170 determine whether incoming data follows a secure protocol. The incoming data can be from a VIVO communication device or from another data source. The secure protocol can be code stored in memory 120. For example, processor 110 can determine whether an incoming call is from a VIVO, determine that a secure protocol is necessary and apply an appropriate authentication.

Figure 2:
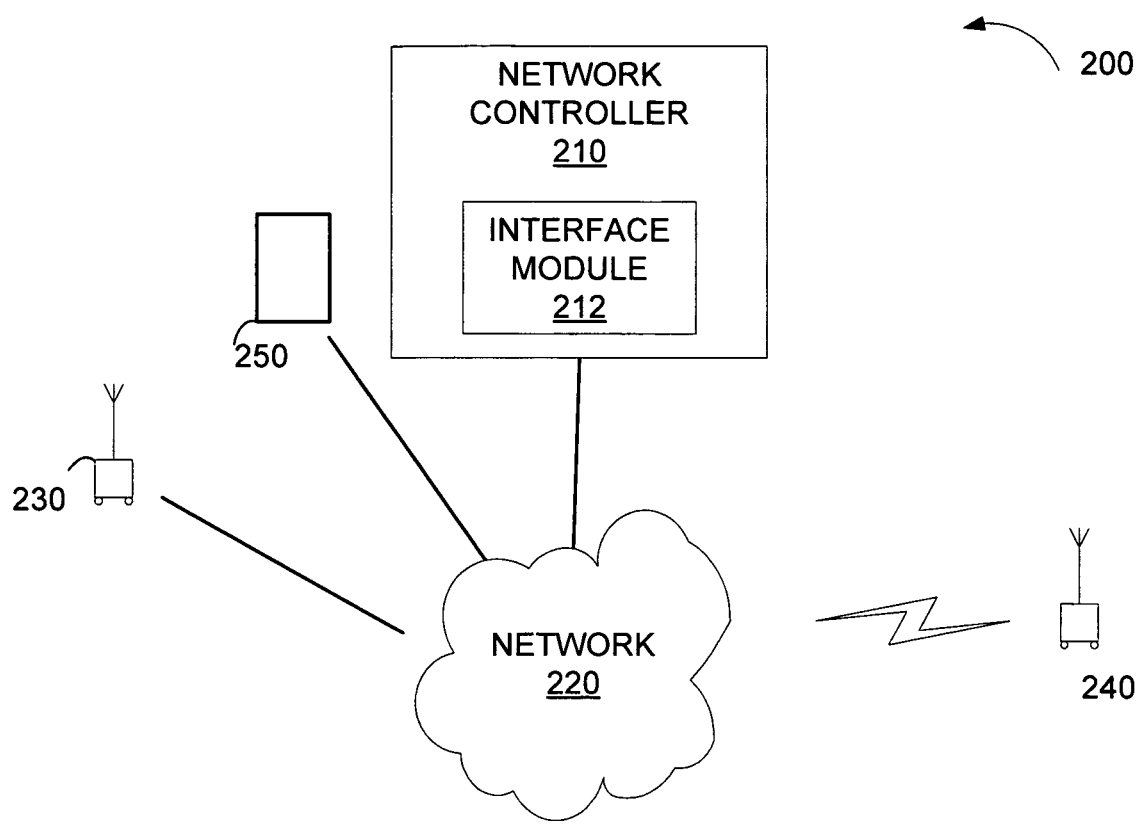
FIG. 2 is a block diagram of a network environment that supports the claimed subject matter of the present application.

Referring now to FIG. 2, illustrated is an exemplary block diagram of a system 200 capable of being operable with VIVO computer systems and interacting with a VIVO-type computer system. System 200 is shown including network controller 210, a network 220, and one or more communication devices 230, 240, and 250. Communication devices 230, 240, and 250 may include telephones, wireless telephones, cellular telephones, personal digital assistants, computer terminals or any other devices that are capable of sending and receiving data.

Network controller 210 is connected to network 220. Network controller 210 may be located at a base station, a service center, or any other location on network 220. Network 220 may include any type of network that is capable of sending and receiving communication signals, including VIVO-type signals. For example, network 220 may include a data network, such as the Internet, an intranet, a local area network (LAN), a wide area network (WAN), a cable network, and other like communication systems. Network 220 may also include a telecommunications network, such as a local telephone network, long distance telephone network, cellular telephone network, satellite communications network, cable television network and other like communications systems that interact with computer systems. Network 220 may include more than one network and may include a plurality of different types of networks. Thus, network 220 may include a plurality of data networks, a plurality of telecommunications networks, and a combination of data and telecommunications networks and other like communication systems.

In operation, one of the communication devices 230, 240, or 250, may attempt a communication with a receiving communication device. The communication can be routed through network 220 and network controller 210 to the receiving communication device. For example, a call originator communication device 230 may attempt a call to a call recipient communication device 240. In an embodiment, controller 210 is a VIVO-enabled controller such that an audible format may be a speech format. According to an embodiment, controller 210 can include an interface module 212 that can interface with a caller to provide voice-enabled methods in accordance with embodiments herein.

Controller 210 can alter the format of the call by performing speech-to-text conversion on the call when controller 210 determines the format of the call requires a format change. Controller 210 can additionally alter the format of the call by performing text-to-speech conversion on the call when controller 210 determines the format of the call requires a format change. Controller 210 can then send the call in an appropriate format to the call recipient 240. In one embodiment, controller 210 is a VIVO-enabled controller that alters speech to text or speech to computer code via interface 212 in accordance with the requirements of a VIVO.

Figure 3:
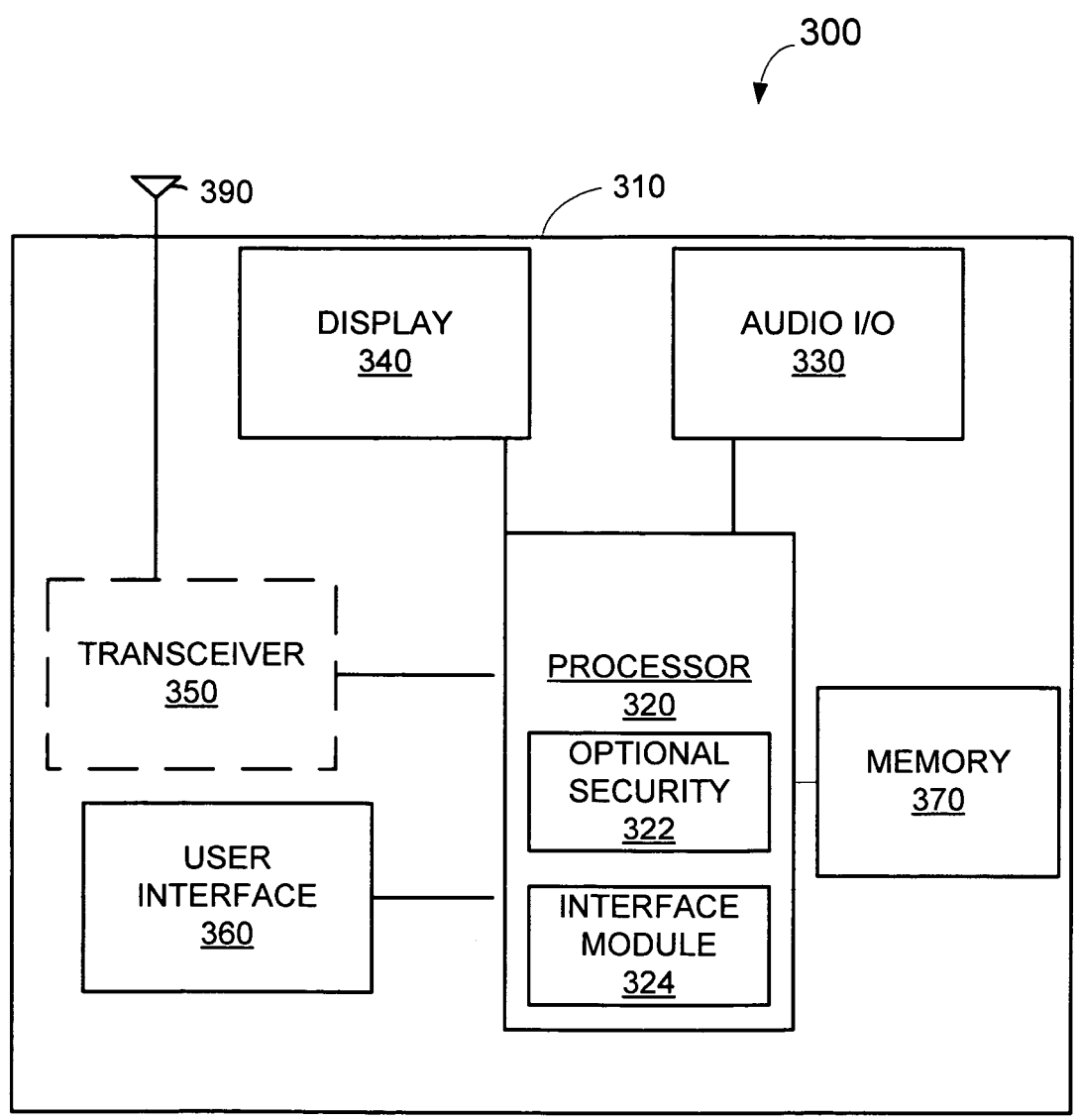
FIG. 3 is a block diagram of a communication device appropriate for embodiments of the subject matter of the present application.

FIG. 3 is an exemplary block diagram of a communication device 300, such as communication device 230 or 240 according to an embodiment. Communication device 300 can include a housing 310, a processor 320, audio input and/or output circuitry 330 coupled to processor 320, a display 340 coupled to processor 320, a user interface 360 coupled to processor 320 and a memory 370 coupled to processor 320. Processor 320 can also include a security module 322. Security module 322 may be hardware coupled to the processor 320. Alternatively, security module 322 could be located within processor 320, or located in software located in memory 370 and executed by processor 320, or any other type of module. Memory 370 can include a random access memory, a read only memory, an optical memory, a subscriber identity module memory, or any other memory that can be coupled to a communication device. Display 340 can be a liquid crystal display (LCD), a light emitting diode (LED) display, a plasma display, or any other means for displaying information. Audio input and/or output circuitry 330 can include a microphone, a speaker, a transducer, or any other audio input and/or output circuitry. User interface 360 can include a keypad, buttons, a touch pad, a joystick, an additional display, or any other device useful for providing an interface between a user and an electronic device.

Processor 320 can be configured to control the functions of communication device 300. Communication device 300 can send and receive signals across network 220 using a transceiver 350 coupled to antenna 390. Alternatively, communication device 300 can be a device relying on twisted pair technology and not utilize transceiver 350.

According to an embodiment, a user can use either the user interface 360 for input and/or output of information to and from communication device 300 or use input and/or output using the audio input and/or output circuitry 330. Data received by communication device 300 can be displayed on display 340 and/or provided audibly through audio input and/or output circuitry 330. Communication device 300 can operate as a VIVO when operated in a fully audible format. For example, VIVO applications can be stored on memory 370 and processed by processor 320. In an embodiment, processor 320 includes interface module 324 and optional security module 322. According to an embodiment, interface module can be disposed within processor 320 and/or can be an interface module coupled to the processor, the interface module configured to (a) receive a vocal input to the voice-capable communication device, (b) receive one or more instructions referential to a first speech output version of the vocal input; and (c) create a second speech output version of the vocal input representational of the first speech output version of the vocal input manipulated responsive to the one or more instructions.

Figure 4A:
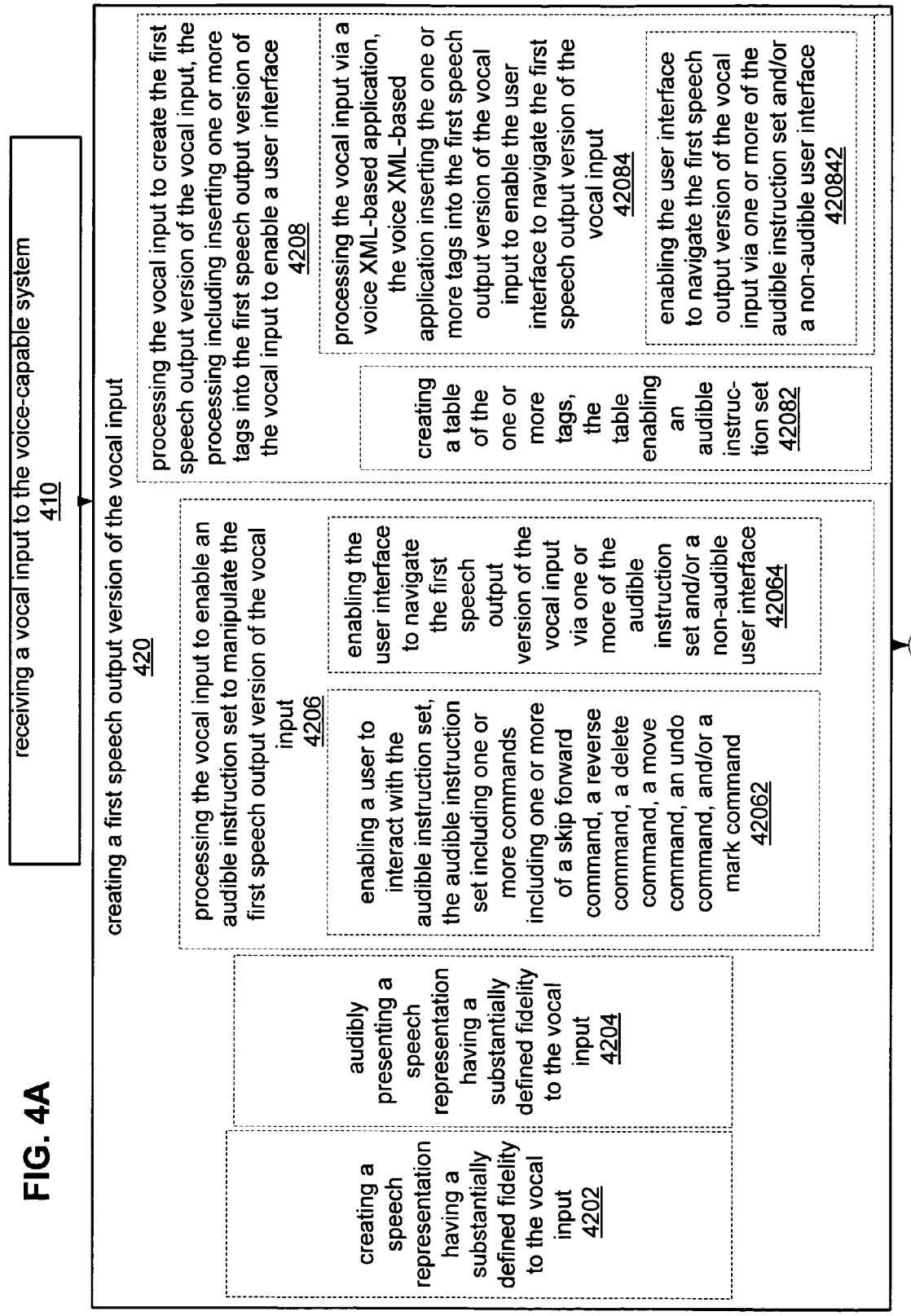
FIGS. 4A, 4B and 4C illustrate a flow diagram of a method in accordance with an embodiment of the subject matter of the present application.
Figure 4B:
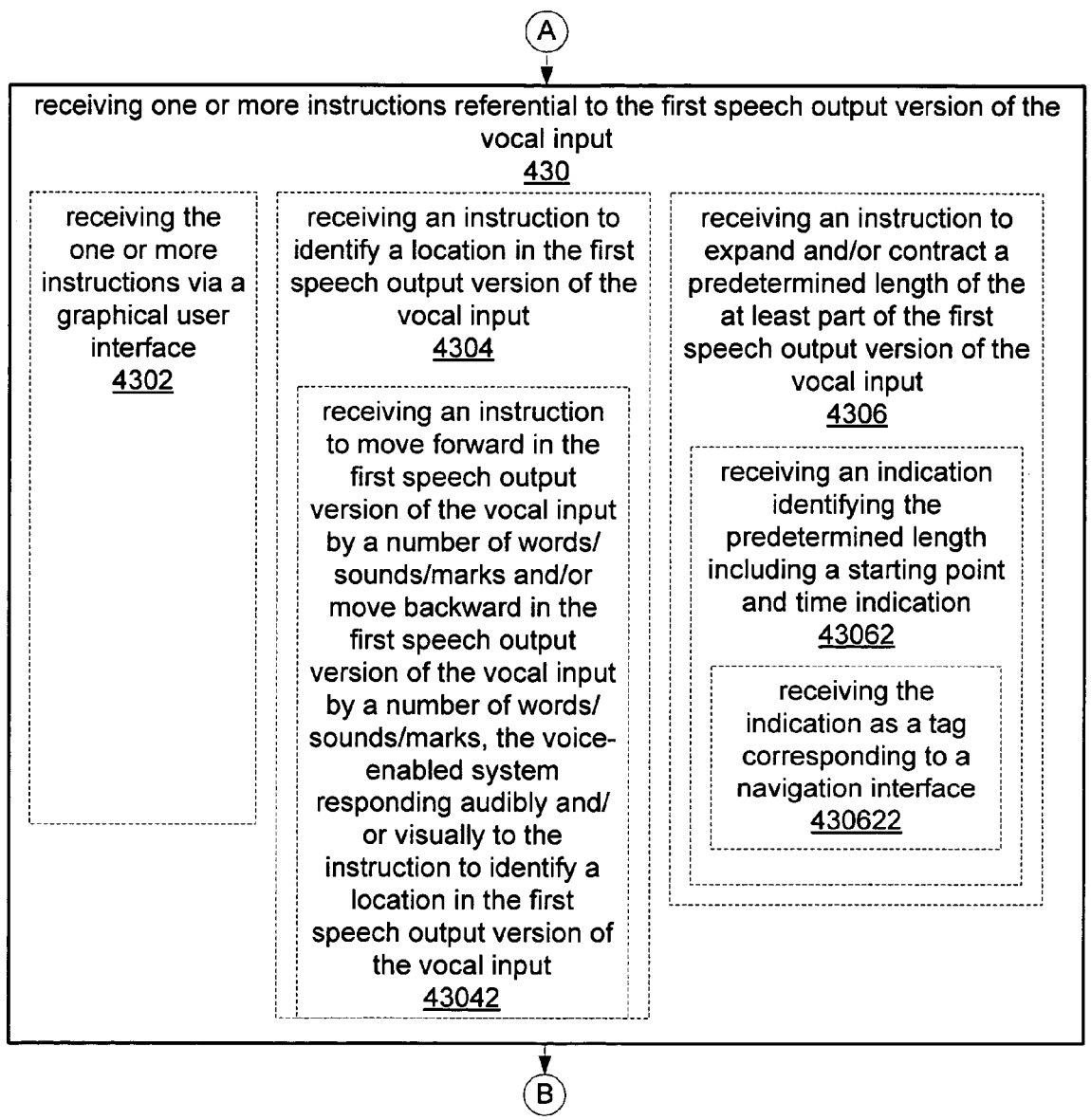
Figure 4C:
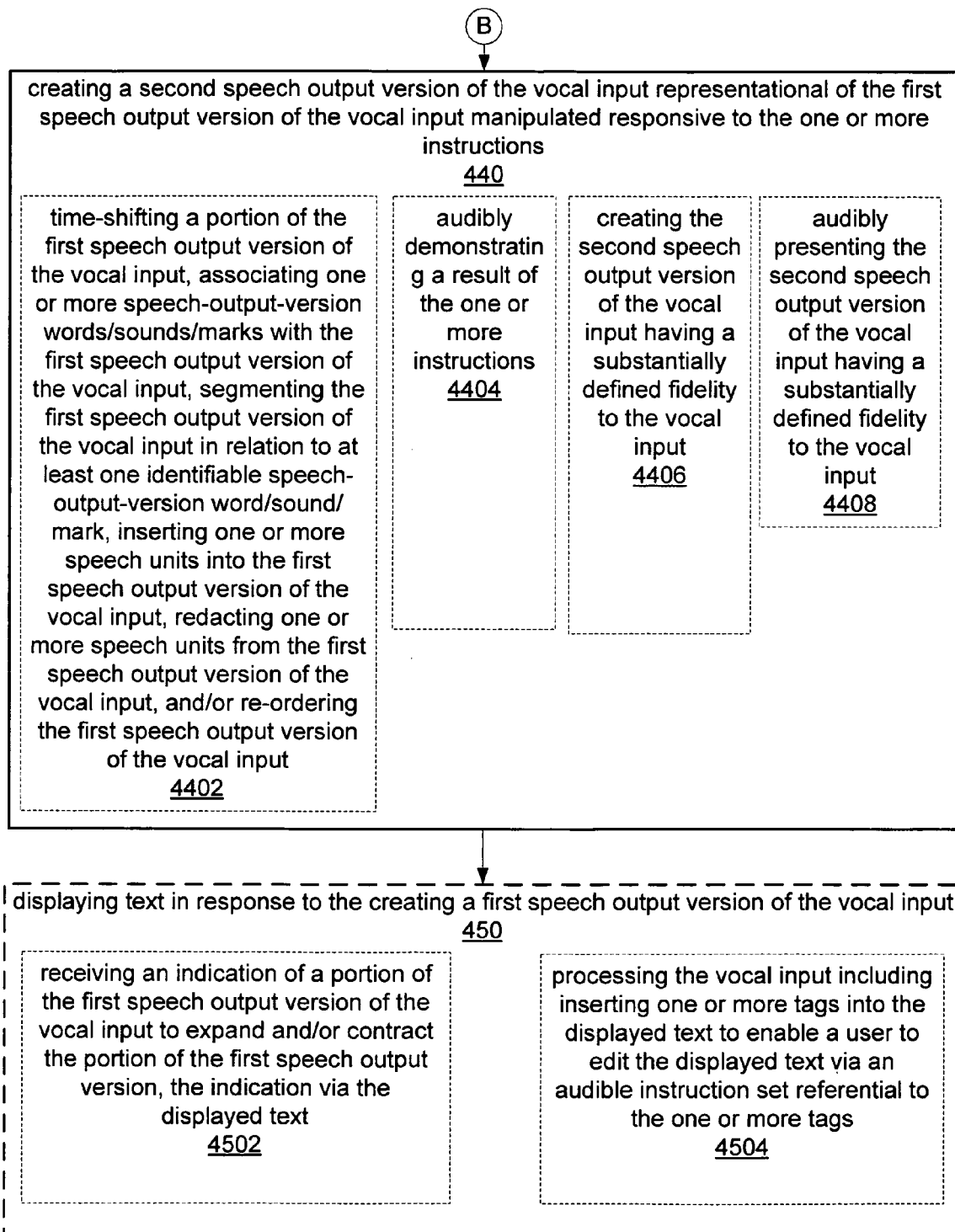

Referring now to FIGS. 4A, 4B and 4C, an exemplary flow diagram illustrates the operation of the processor 320, interface module 324 and/or user interface 360 and/or network controller 210 according to an embodiment.

Block 410 provides for receiving a vocal input to the voice-capable system. The vocal input can be via a microphone from a user, can be a vocal input received via a network interface, can be a recorded vocal input, or can be a created vocal input from a digital source.

Block 420 provides for creating a first speech output version of the vocal input. The first speech output version can be a digitized representation of the vocal input created using known digitization methods. As will be appreciated by those of skill in the art, the digitization can be at a system-defined sampling rate that is appropriate for speaker recognition and/or system requirements for fidelity. In one embodiment, the sampling rate of the first speech output version is adjustable so that a VIVO system can interact with different systems. For example, a voice mail system may be storage limited requiring a lower sampling rate. Conversely, the sampling rate could be at a higher rate for purposes of editing the first speech output version, and later altered to a lower sampling rate after a destination system sampling rate is determined.

Block 4202 provides for creating a speech representation having a substantially defined fidelity to the vocal input. A substantially defined fidelity to the vocal input can be a defined fidelity in accordance with known standards such as within parameters defined by a POTS (plain old telephone system), or another standard. For example, a fully digital system can define a fidelity which enables recognition of a speaker that is different from an analog representation. Accordingly, in one embodiment, the defined fidelity is adjustable in accordance with the speech representation required for a destination system. As one of skill in the art will appreciate, the defined fidelity depends on a number of characteristics of the speech representation including sampling rate, bandwidth of frequencies of the speech representation, signal to noise ratio of the speech representation, and the like. In some instances the substantially defined fidelity will be that combination of factors that the system designer deems appropriate for the application, such as, for example, fidelity that allows some statistically significant identification of a speaker by a listener (e.g., 85% of listeners can identify the speaker at the define fidelity.)

Block 4204 provides for audibly presenting a speech representation having a substantially defined fidelity to the vocal input. For example, the audible presentation can be such that a user can hear the speech representation to enable editing the audible presentation. The fidelity of the speech representation can be in a form that could be transmitted by the user so that a realistic representation for a format chosen by the user can be heard.

Block 4206 provides for processing the vocal input to enable an audible instruction set to manipulate the first speech output version of the vocal input. More particularly, processor 320 can process a first speech output version of the vocal input received via user interface 360 using interface module 324. Interface module 324 can include an audible instruction set or provide access to an audible instruction set, such as via memory 370.

Displayed within block 4206 is optional block 42062, which provides for enabling a user to interact with the audible instruction set, the audible instruction set including one or more commands including one or more of a skip forward command, a reverse command, a delete command, a move command, an undo command, and/or a mark command. For example, a user interacting with interface module 324 via a user interface can interact with the first speech output version of the vocal input via the audible instruction set.

Also displayed within block 4206 is optional block 42064 which provides for enabling the user interface to navigate the first speech output version of the vocal input via one or more of the audible instruction set and/or a non-audible user interface.

Block 4208 provides for processing the vocal input to create the first speech output version of the vocal input, the processing including inserting one or more tags into the first speech output version of the vocal input to enable a user interface. Block 4208 includes optional block 42082, which provides for creating a table of the one or more tags, the table enabling an audible instruction set. The table can be stored in memory 370 to provide access to the interface module 324. The table can be configured to interact with an XML application, which can be a vocal XML application, or other interactive method as one of skill in the art will appreciate with the benefit of this disclosure.

Block 4208 also includes optional block 42084, which provides for processing the vocal input via a voice XML-based application, the voice XML-based application inserting the one or more tags into the first speech output version of the vocal input to enable the user interface to navigate the first speech output version of the vocal input. The voice XML-based application can interact with the table stored in memory 370.

Block 42084 includes block 420842, which provides for enabling the user interface to navigate the first speech output version of the vocal input via one or more of the audible instruction set and/or a non-audible user interface. Thus, a user can interact with the instruction set via a keyboard or other input device as is convenient to the user.

Block 430 provides for receiving one or more instructions referential to the first speech output version of the vocal input. More particularly, a user can interact with the first speech output version of the vocal input in accordance with the audible instruction set, or another method of interaction.

Block 430 includes optional block 4302, which provides for receiving the one or more instructions via a graphical user interface. A graphical user interface can be implemented via interface 324 or another application present on a user device or the like. In one embodiment, the graphical user interface can be a voice XML based application or other appropriate application.

Block 430 further includes optional block 4304 which provides for receiving an instruction to identify a location in the first speech output version of the vocal input. The instruction can be orally provided or via another input method. Block 4304 includes optional block 43042, which provides for receiving an instruction to move forward in the first speech output version of the vocal input by a number of words/sounds/marks and/or move backward in the first speech output version of the vocal input by a number of words/sounds/marks, the voice-enabled system responding audibly and/or visually to the instruction to identify a location in the first speech output version of the vocal input.

Block 430 further includes optional block 4306 which provides for receiving an instruction to expand and/or contract a predetermined length of the first speech output version of the vocal input. For example, if a user is leaving a voice mail, the user can interact with the vocal input to shorten or lengthen the voice mail. The expansion and contraction can be accomplished via known voice processing techniques that alter the voice mail.

Block 4306 includes block 43062, which provides for receiving an indication identifying the predetermined length including a starting point and time indication. For example, a user can identify a portion of the vocal input that relates to a voice mail to be output from the system that should be removed instead of having to rerecord the voice mail in its entirety.

Block 43062 includes optional block 430622, which provides for receiving the indication as a tag corresponding to a navigation interface. For example, the first speech output version of the vocal input can include tags automatically inserted into the first speech output version of the vocal input that enable a user to reference an output from the system to alter the output. A user can reference the tag by providing a number of seconds to delete, a section of the first speech output version of the vocal input between tags to delete or expand or the like.

Block 440 provides for creating a second speech output version of the vocal input representational of the first speech output version of the vocal input manipulated responsive to the one or more instructions. The first speech output version of the vocal input can be intended for voice mail or another vocal output. Thus, the one or more instructions can be configured to create a voice mail output as the second speech output version of the vocal input. Block 440 includes optional block 4402, which provides that the creating a second speech output person can include time-shifting a portion of the first speech output version of the vocal input, associating one or more speech-output-version words/sounds/marks with the first speech output version of the vocal input, segmenting the first speech output version of the vocal input in relation to at least one identifiable speech-output-version word/sound/mark, inserting one or more speech units into the first speech output version of the vocal input, redacting one or more speech units from the first speech output version of the vocal input, and/or re-ordering the first speech output version of the vocal input. The speech output version can include words, sounds and/or marks that segment the first speech output version. In one embodiment, the words, sounds and/or marks can be spoken, inserted via a keyboard or provided by another method to enable manipulation of the first speech output version of the vocal input.

Block 440 also includes optional block 4404, which provides for audibly demonstrating a result of the one or more instructions. Thus, a user can hear the results of manipulating a speech output version of the vocal input.

Block 440 also include optional block 4406 which provides that the creating a second speech output version of the vocal input representational of the first speech output version of the vocal input manipulated responsive to the one or more instructions can include creating the second speech output version of the vocal input having a substantially defined fidelity to the vocal input.

Block 440 also includes 4408 which provides that the creating a second speech output version of the vocal input representational of the first speech output version of the vocal input manipulated responsive to the one or more instructions can include audibly presenting the second speech output version of the vocal input having a substantially defined fidelity to the vocal input. The audible presentation can be via a speaker, a headset or other appropriate audible presentation medium. In one embodiment, the audible presentation allows user to hear how an actual output heard by a destination entity would sound. Therefore, a user can determine the natural qualities of an output after manipulation of the vocal input. In one embodiment, the user is not the creator of the vocal input. Rather, the audible presentation can enable an assistant of other entity to check the vocal input after manipulation prior to any output being transmitted. The ability to audibly check a second speech output version of the vocal input after the user manipulates the vocal input can enable confirmation of the natural qualities of the output.

Block 450 provides for displaying text in response to the creating a first speech output version of the vocal input. Block 450 includes optional block 4502 which provides for receiving an indication of a portion of the first speech output version of the vocal input to expand and/or contract the portion of the first speech output version, the indication via the displayed text. In an embodiment, rather than an audible presentation or in addition to an audible presentation, a user can manipulate the first speech output version of the vocal input by manipulating a displayed text.

Block 450 further includes optional block 4504 which provides for processing the vocal input including inserting one or more tags into the displayed text to enable a user to edit the displayed text via an audible instruction set referential to the one or more tags. Thus, for example, an XML application can be used to display the text that is independent of or in addition to a voice XML application.

Referring now to FIG. 5, an embodiment is directed to voice-capable user interface configured to manipulate a first speech output version of a vocal input. Interface 500 is shown including a set of editing tools 510. The voice-capable user interface includes, as shown in blocks 512, 514, 516 and 518, respectively, a set of editing tools capable of interacting with the first speech output version of the vocal input, the set of tools including one or more of a forwarding tool configured to forward to an identified location in the first speech output version of the vocal input, a reverse tool configured to reverse to an identified location in the first speech output version of the vocal input, an undo tool configured to reverse a prior action performed, a marking tool configured to mark a point in the first speech output version of the vocal input, and an expansion/contraction tool configured to expand and/or contract a predetermined length of the first speech output version of the vocal input. Interface 500 further includes block 520 illustrating a confirmation tool configured to produce a second speech output version of the vocal input representational of the first speech output version of the vocal input manipulated responsive to use of one or more tools of the set of editing tools.

In one embodiment, the block 510 set of editing tools is configured to operate on one or more of a mobile communication device, a voice email system, and a portable mobile device. In another embodiment, the tools shown in block 510 are a set of editing tools includes a navigation tool that enables a user to identify a number of words detected in the first speech output version of the vocal input, the navigation tool is configured to enable a user to state a number of words to step forward, and/or a number of words to step back in the first speech output version of the vocal input. In one embodiment, the navigation tool is configured to enable a user to state a number of words to delete, move, and/or mark in the first speech output version of the vocal input. Further, in an embodiment, the navigation tool is configured to enable a user to state a key word and move a cursor to at least one location where the key word is located in the first speech output version of the vocal input. Optionally, the navigation tool is configured to enable a user to state a numerical reference in the first speech output version of the vocal input and move a cursor to at least one location where the numerical reference is located.

In another embodiment, the navigation tool is configured to enable a user to provide a non-vocal audible command that affects the first speech output version of the vocal input. For example, in one configuration, the non-vocal audible command includes one or more of a click, a chime, and a beep.

Figure 6:
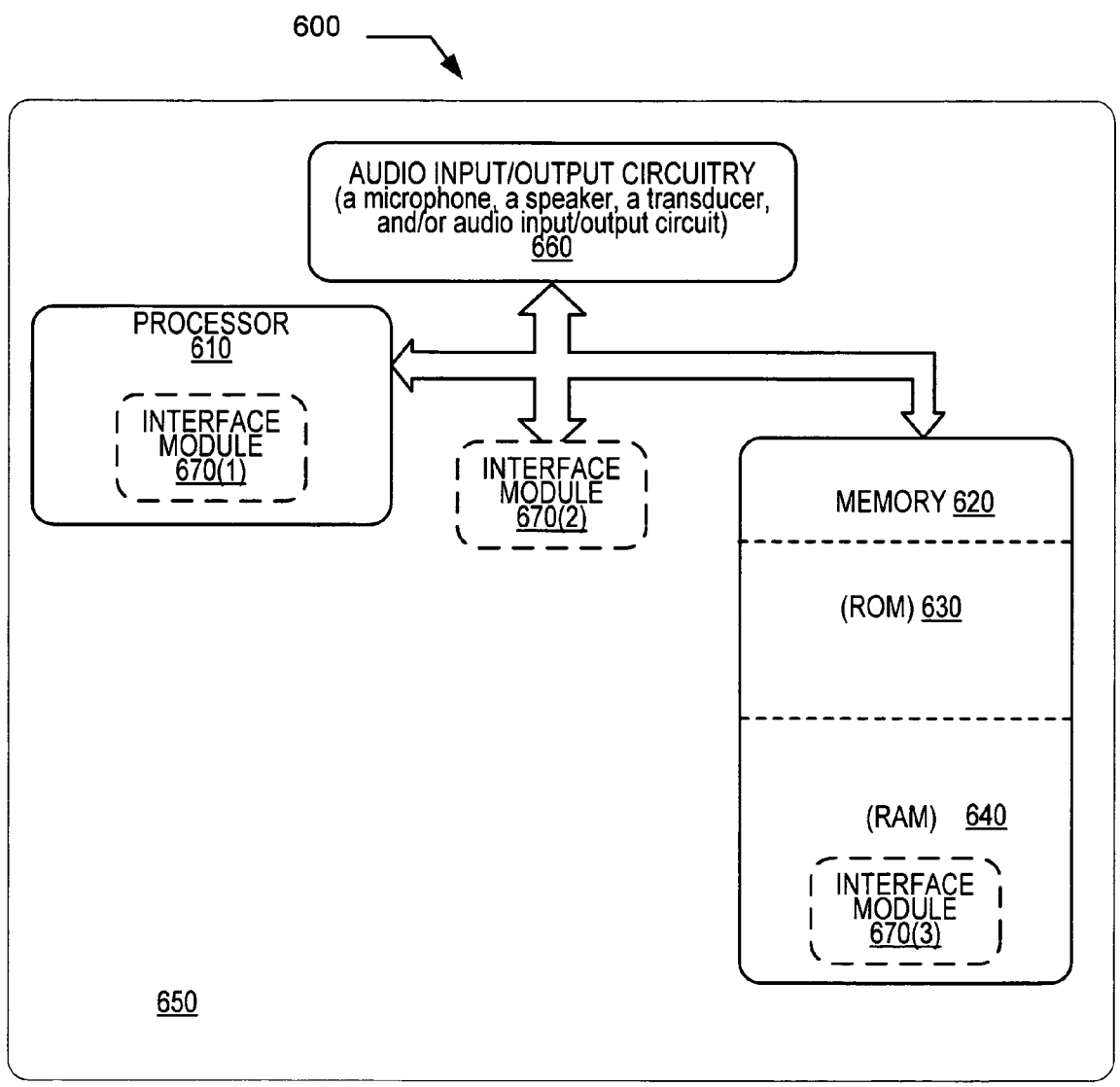
FIG. 6 illustrates a voice-capable communication device in accordance with an embodiment of the subject mater of the present application.

Referring now to FIG. 6, a voice-capable communication device 600 is shown. The voice-capable communication device 600 is shown including a processor 610, and a memory coupled to the processor, memory 620. Memory 620 can include read-only memory (ROM) 630 and/or read and write memory (RAM) 640.

The voice-capable communication device 600 is shown further including an interface module 670. The interface module can be configured such that the interface module is coupled to the processor, located within the processor, and/or located in the memory. The optional locations of interface module 670 are designated as interface module 670(1), 670(2) and 670(3).

Interface module 670 can be configured as an interface module within the processor 610 and/or an interface module coupled to the processor, the interface module configured to (a) receive a vocal input to the voice-capable communication device, (b) receive one or more instructions referential to a first speech output version of the vocal input; and (c) create a second speech output version of the vocal input representational of the first speech output version of the vocal input manipulated responsive to the one or more instructions.

The voice-capable communication device 600 is shown further including audio input and/or output circuitry 660. In one embodiment, the audio input and/or output circuitry includes one or more of a microphone, a speaker, a transducer, an audio input and/or output circuit.

In one embodiment voice-capable communication device 600 is disposed in a housing 650. More particularly, housing 650 is a housing coupled to the processor, the housing encasing the memory, the processor, and/or the audio input and/or output circuitry.

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

We claim:

1. A method for a voice-capable system, the method comprising:
   receiving a vocal input to the voice-capable system;
   processing the vocal input to create a first speech output version of the vocal input, the processing including at least:
      determining one or more destination systems for the first speech output version of the vocal input;
      altering a sample rate of the vocal input to enable the vocal input to interact with the one or more destination systems;
      and
      receiving one or more non-vocal audible instructions referential to the first speech output version of the vocal input; and
   creating a second speech output version of the vocal input, the second output version being the first speech output version of the vocal input content manipulated responsive to the one or more non-vocal audible instructions.

2. The method of claim 1, wherein the processing the vocal input to create a first speech output version of the vocal input includes at least one of:
   creating a speech representation having a substantially defined fidelity to the vocal input, or audibly presenting a speech representation having a substantially defined fidelity to the vocal input.

3. The method of claim 1, wherein the processing the vocal input to create a first speech output version of the vocal input includes at least one of:
   enabling a user to interact with an audible instruction set configured to manipulate the first speech output version of the vocal input, the audible instruction set including one or more commands including one or more of a skip forward command, a reverse command, a delete command, a move command, an undo command, and/or a mark command, or enabling a user interface to navigate the first speech output version of the vocal input via a non-vocal audible instruction set.

4. The method of claim 1 further comprising:
   inserting one or more tags into the first speech output version of the vocal input to enable a user interface to navigate the first speech output version of the vocal input via a non-vocal audible instruction set.

5. The method of claim 4, wherein inserting one or more tags into the first speech output version of the vocal input to enable a user interface to navigate the first speech output version of the vocal input via a non-vocal audible instruction set-includes:
   creating a table of the one or more tags, the table enabling at least a non-vocal audible instruction set.

6. The method of claim 1, wherein the processing the vocal input to create the first speech output version of the vocal input includes:
   inserting one or more tags into the first speech output version of the vocal input to enable a user interface; and
   processing the vocal input via a voice XML-based application, the voice XML-based application inserting one or more time-delineated tags into the speech representation of the vocal input to create the first speech output version, each tag configured to be referenced by providing a time value.

7. The method of claim 6, wherein processing the vocal input via a voice XML-based application, the voice XML-based application inserting one or more time-delineated tags into the speech representation of the vocal input to create the first speech output version, each tag configured to be referenced by providing a time value includes:
   enabling a user interface to navigate the first speech output version of the vocal input via one or more of an audible instruction set and/or a non-audible user interface.

8. The method of claim 1, wherein the receiving one or more non-vocal audible instructions referential to the first speech output version of the vocal input includes:
   receiving a non-vocal audible instruction to identify a number of words to move to a different location in the first speech output version of the vocal input.

9. The method of claim 8, wherein the receiving a non-vocal audible instruction to identify a location in the first speech output version of the vocal input includes:
   receiving a non-vocal audible instruction to move forward in the first speech output version of the vocal input by a number of words and/or sounds and/or marks and/or move backward in the first speech output version of the vocal input by a number of words and/or sounds and/or marks, the voice-enabled system responding audibly and/or visually to the non-vocal audible instruction to identify a location in the first speech output version of the vocal input.

10. The method of claim 1, wherein the receiving one or more non-vocal audible instructions referential to the first speech output version of the vocal input includes:
    receiving a non-vocal audible instruction to expand and/or contract a predetermined length of the first speech output version of the vocal input.

11. The method of claim 10, wherein receiving a non-vocal audible instruction to expand and/or contract a predetermined length of the first speech output version of the vocal input includes:
    receiving a non-vocal audible indication identifying the predetermined length including a starting point and time indication.

12. The method of claim 11, wherein the receiving a non-vocal audible indication identifying the predetermined length including a starting point and time indication includes:
    receiving the time indication as a tag corresponding to a navigation interface.

13. The method of claim 1, wherein the creating a second speech output version of the vocal input, the second output version being the first speech output version of the vocal input content manipulated responsive to the one or more audible instructions, comprises:
    re-ordering the first speech output version of the vocal input responsive to the one or more non-vocal audible instructions.

14. The method of claim 1, wherein the creating a second speech output version of the vocal input, the second output version being the first speech output version of the vocal input content manipulated responsive to the one or more non-vocal audible instructions, comprises:
   audibly demonstrating a result of the one or more non-vocal audible instructions.

15. The method of claim 1, wherein the creating a second speech output version of the vocal input, the second output version being the first speech output version of the vocal input content manipulated responsive to the one or more non-vocal audible instructions, comprises:
   creating the second speech output version of the vocal input having a substantially defined fidelity to the vocal input.

16. The method of claim 1, wherein the creating a second speech output version of the vocal input, the second output version being the first speech output version of the vocal input content manipulated responsive to the one or more non-vocal audible instructions, includes:
   audibly presenting the second speech output version of the vocal input having a substantially defined fidelity to the vocal input.

17. The method of claim 1, further comprising:
   displaying text in response to the creating a first speech output version of the vocal input.

18. The method of claim 17, wherein the displaying text in response to the creating a first speech output version of the vocal input includes:
   receiving an indication of a portion of the first speech output version of the vocal input to expand and/or contract the portion of the first speech output version, the indication via the displayed text.

19. The method of claim 17, wherein the displaying text in response to the creating a first speech output version of the vocal input includes:
   processing the vocal input including inserting one or more tags into the displayed text to enable a user to edit the displayed text via an audible instruction set referential to the one or more tags.

20. The method of claim 1, wherein determining one or more destination systems for the first speech output version of the vocal input includes:
   determining the one or more destination systems for the first speech output version of the vocal input, the one or more destination systems being at least one or more systems along a path to a final destination system for the first speech output version of the vocal input.

21. The method of claim 1, wherein processing the vocal input to create a first speech output version of the vocal input, the processing further including:
   formatting the vocal input to computer code.

22. An article of manufacture comprising a voice-capable user interface module stored in a computer storage medium configured to manipulate a first speech output version of a vocal input, the voice-capable user interface comprising:
   a set of editing tools capable of enabling verbal interaction with the first speech output version of the vocal input, the vocal input processed to create the first speech output version via determining one or more destination systems for the first speech output version of the vocal input and altering a sample rate of the vocal input to enable the vocal input to interact with the one or more destination systems, the set of editing tools including at least a navigation tool that enables a user to identify a number of words to move to a different location in the first speech output version of the vocal input; and
   a confirmation tool configured to produce a second speech output version of the vocal input representational of the first speech output version of the vocal input manipulated responsive to use of one or more tools of the set of editing tools.

23. The voice-capable user interface module of claim 22 wherein the set of editing tools is configured to operate on one or more of a mobile communication device, a voice email system, or a portable mobile device.

24. The voice-capable user interface module of claim 22 wherein the set of editing tools includes one or more of a forwarding tool configured to forward to an identified location in the first speech output version of the vocal input, a reverse tool configured to reverse to an identified location in the first speech output version of the vocal input, an undo tool configured to reverse a prior action performed, a marking tool configured to mark a point in the first speech output version of the vocal input, or an expansion/contraction tool configured to expand and/or contract a predetermined length of the first speech output version of the vocal input.

25. The voice-capable user interface module of claim 22 wherein the navigation tool is configured to enable a user to state a number of words to step forward, and/or a number of words to step back in the first speech output version of the vocal input.

26. The voice-capable user interface module of claim 22 wherein the navigation tool is configured to enable a user to state a number of words to at least one of delete or mark in the first speech output version of the vocal input.

27. The voice-capable user interface module of claim 22 wherein the navigation tool is configured to enable a user to provide a non-vocal audible command to perform one or more operations of the navigation tool.

28. The voice-capable user interface module of claim 22 wherein the navigation tool is configured to enable a user to state a numerical reference in the first speech output version of the vocal input and move a cursor to at least one location where the numerical reference is located.

29. The voice-capable user interface module of claim 22 wherein the set of editing tools includes at least one tool configured to enable a user to provide a non-vocal audible command that affects the first speech output version of the vocal input.

30. A computer program product including one or more instructions for a voice-capable system, the computer program product comprising:
   a non-transitory signal bearing medium bearing at least:
      one or more instructions for receiving a vocal input to the voice-capable system,
      one or more instructions for processing the vocal input to create a first speech output version of the vocal input, the one or more instructions for processing including at least:
         one or more instructions for creating a speech representation of the vocal input with an adjustable fidelity;
         one or more instructions for determining one or more destination systems for the first speech output version of the vocal input;
         one or more instructions for altering a sample rate of the vocal input to enable the vocal input to interact with the one or more destination systems;
      one or more instructions for receiving one or more audible instructions referential to the first speech output version of the vocal input; and one or more instructions for re-ordering the first speech output version of the vocal input responsive to the one or more audible instructions; and one or more instructions for creating a second speech output version of the vocal input representational of the first speech output version of the vocal input manipulated responsive to the one or more instructions.

31. The computer program product of claim 30 wherein the signal bearing medium comprises:
a recordable medium.

32. The computer program product of claim 30 wherein the one or more instructions for receiving a vocal input to the voice-capable system includes:
one or more instructions for processing the vocal input to enable an audible instruction set to manipulate the first speech output version of the vocal input.

33. The computer program product of claim 32 wherein the one or more instructions for processing the vocal input to enable an audible instruction set to manipulate the first speech output version of the vocal input includes:
one or more instructions for enabling a user to interact with the audible instruction set, the audible instruction set including one or more commands including one or more of a skip forward command, a reverse command, a delete command, a move command, an undo command, and/or a mark command.

34. The computer program product of claim 32 wherein the one or more instructions for processing the vocal input to enable an audible instruction set to manipulate the first speech output version of the vocal input includes:
one or more instructions for enabling the user interface to navigate the first speech output version of the vocal input via one or more of the audible instruction set and/or a non-audible user interface.

35. The computer program product of claim 30 wherein the one or more instructions for receiving a vocal input to the voice-capable system includes:
one or more instructions for processing the vocal input to create the first speech output version of the vocal input, the processing including inserting one or more tags into the first speech output version of the vocal input to enable a user interface.

36. The computer program product of claim 35 wherein the one or more instructions for processing the vocal input to create the first speech output version of the vocal input, the processing including inserting one or more tags into the first speech output version of the vocal input to enable a user interface includes:
one or more instructions for processing the vocal input via a voice XML-based application, the voice XML-based application inserting the one or more tags into the first speech output version of the vocal input to enable the user interface to navigate the first speech output version of the vocal input.

37. The computer program product of claim 36 wherein the one or more instructions for processing the vocal input via a voice XML-based application, the voice XML-based application inserting the one or more tags into the first speech output version of the vocal input to enable the user interface to navigate the first speech output version of the vocal input includes:
one or more instructions for enabling the user interface to navigate the first speech output version of the vocal input via one or more of the audible instruction set and/or a non-audible user interface.

38. The computer program product of claim 30 wherein the one or more instructions for receiving one or more instructions referential to the first speech output version of the vocal input includes:
one or more instructions for receiving an instruction to identify a location in the first speech output version of the vocal input.

39. The computer program product of claim 38 wherein the one or more instructions for receiving an instruction to identify a location in the first speech output version of the vocal input includes:
one or more instructions for receiving an instruction to move forward in the first speech output version of the vocal input by a number of words and/or sounds and/or marks and/or move backward in the first speech output version of the vocal input by a number of words and/or sounds and/or marks, the voice-enabled system responding audibly and/or visually to the instruction to identify a location in the first speech output version of the vocal input.

40. The computer program product of claim 30 wherein the one or more instructions for receiving one or more instructions referential to the first speech output version of the vocal input includes:
one or more instructions for receiving an instruction to expand and/or contract a predetermined length of the first speech output version of the vocal input.

41. The computer program product of claim 40 wherein the one or more instructions for said receiving an instruction to expand and/or contract a predetermined length of the first speech output version of the vocal input includes:
one or more instructions for receiving an indication identifying the predetermined length including a starting point and time indication.

42. The computer program product of claim 30 wherein one or more instructions for processing the vocal input to create a first speech output version of the vocal input includes:
one or more instructions for identifying a number of words to move to a different location in the first speech output version of the vocal input.

43. The computer program product of claim 30 wherein the one or more instructions for creating a second speech output version of the vocal input representational of the first speech output version of the vocal input manipulated responsive to the one or more instructions includes:
one or more instructions for time-shifting a portion of the first speech output version of the vocal input, associating one or more speech-output-version words and/or sounds and/or marks with the first speech output version of the vocal input;

one or more instructions for segmenting the first speech output version of the vocal input in relation to at least one identifiable speech-output-version word and/or sound and/or mark;

one or more instructions for inserting one or more speech units into the first speech output version of the vocal input;

one or more instructions for redacting one or more speech units from the first speech output version of the vocal input; and one or more instructions for re-ordering the first speech output version of the vocal input.

44. The computer program product of claim 30 further comprising:
one or more instructions for displaying text in response to the creating a first speech output version of the vocal input.

45. The computer program product of claim 30 further comprising:
one or more instructions for displaying text in response to the creating a first speech output version of the vocal input including:
one or more instructions for receiving an indication of a portion of the first speech output version of the vocal input to expand and/or contract the portion of the first speech output version, the indication via the displayed text.

46. The computer program product of claim 45 wherein the one or more instructions for displaying text in response to the creating a first speech output version of the vocal input includes:
one or more instructions for processing the vocal input including inserting one or more tags into the displayed text to enable a user to edit the displayed text via an audible instruction set referential to the one or more tags.

47. A voice-capable communication device comprising:
a processor;
an audio input and/or output circuitry coupled to the processor;
a memory coupled to the processor; and
an interface module coupled to the processor, the interface module configured to (a) receive a vocal input to the voice-capable communication device, (b) process the vocal input to create a first speech output version of the vocal input via determining one or more destination systems for the first speech output version of the vocal input and altering a sample rate of the vocal input to enable the vocal input to interact with the one or more destination systems, (c) receive one or more non-vocal audio instructions referential to the first speech output version of the vocal input; and (d) create a second speech output version of the vocal input of the first speech output version of the vocal input content manipulated responsive to the one or more non-vocal audio instructions.

48. The voice-capable communication device of claim 47 wherein the interface module is coupled to the processor, located within the processor, and/or located in the memory.

49. The voice capable communication device of claim 47 wherein the memory is one or more of random access memory, read only memory, an optical memory, or a subscriber identity module memory.

50. A method for a voice-capable system, the method comprising:
receiving a vocal input to the voice-capable system;
processing the vocal input to create a textual first speech output version of the vocal input by:
(a) creating a visible textual speech representation of the vocal input;
(b) determining one or more destination systems for the first speech output version of the vocal input and altering a sample rate of the vocal input to enable the vocal input to interact with the one or more destination systems; and
(c) enabling a user to identify a number of words to move to a different location in the first speech output version of the vocal input; and
receiving one or more instructions referential to the visible textual first speech output version of the vocal input to enable audible instruction manipulation of identified visible textual content; and
creating a second speech output version of the vocal input, the second output version being the first speech output version of the vocal input content manipulated responsive to the one or more instructions.

\* \* \* \* \*